Figure 1:
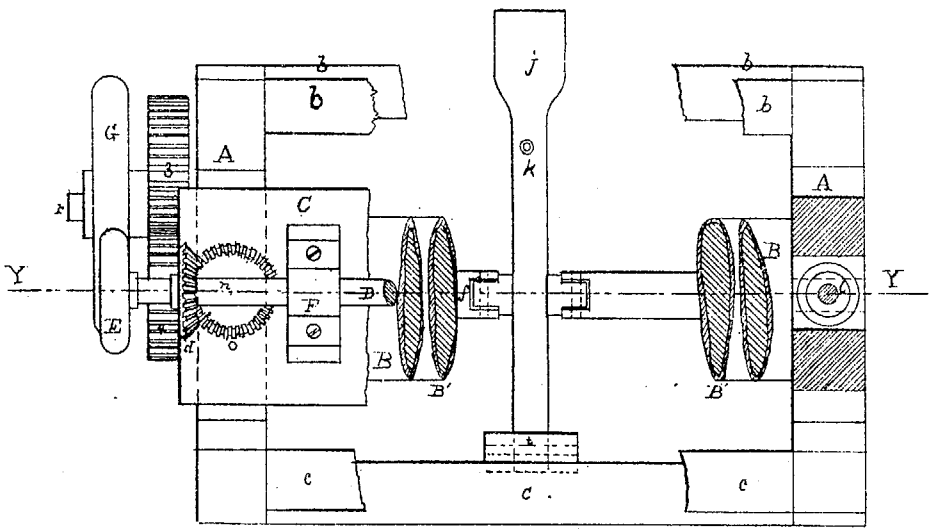

[57.] 2 Sheets--Sheet 1.

JOEL WHITNEY.

Improvement in Rolling Leather.

No. 4,562. Reissued Sep. 19, 1871.

WITNESSES.
A. L. Porter
Eugene Weil

INVENTOR.
Joel Whitney
By T. W. Porter, Atty

AM. PHOTO-LITHOGRAPHIC CO. N.Y. (OSBORNE'S PROCESS)

[57.] 2 Sheets--Sheet 2.
JOEL WHITNEY.
Improvement in Rolling Leather.
No. 4,562. Reissued Sep. 19, 1871.
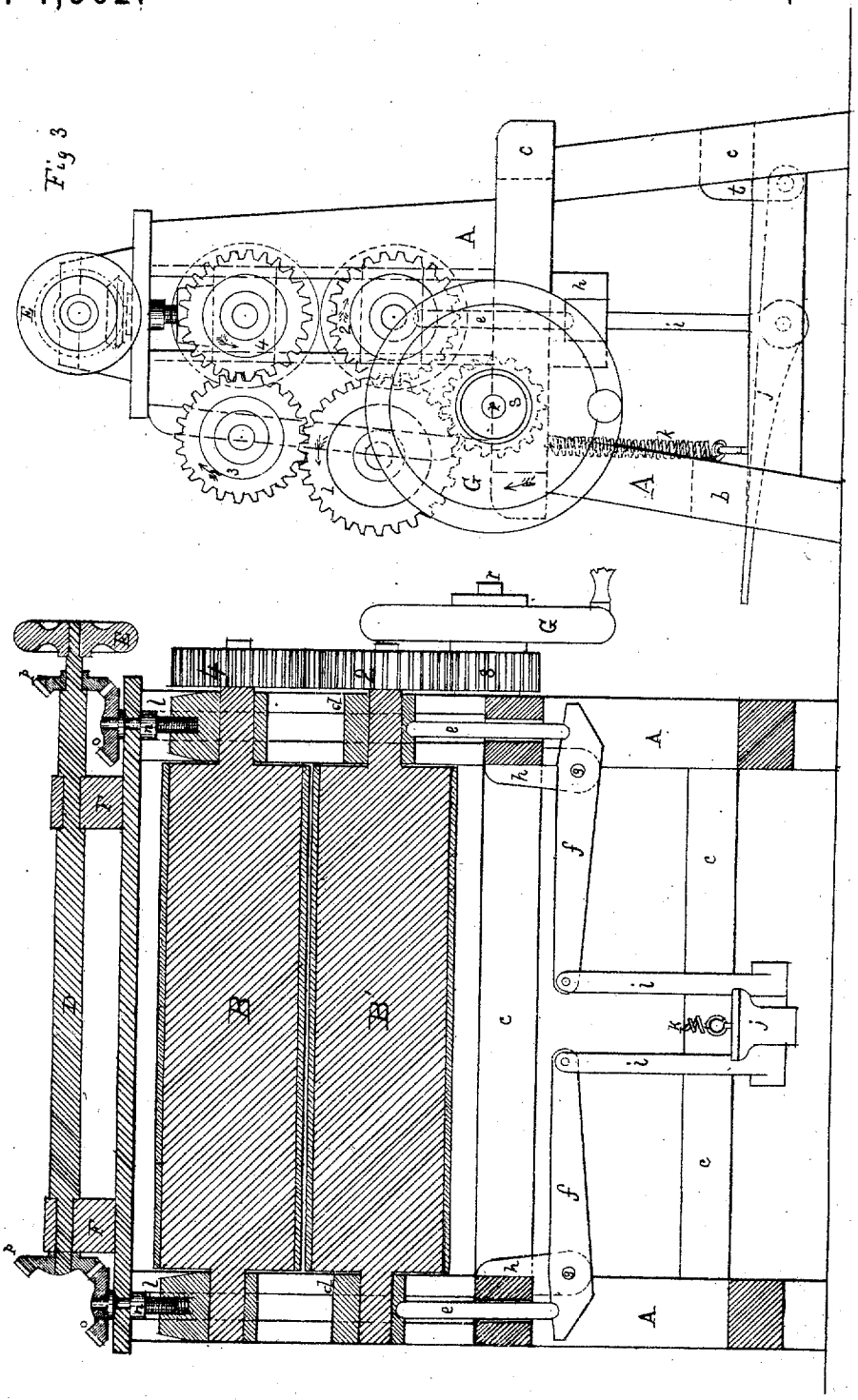
WITNESSES.
H. K. Porter
Eugene Weil
INVENTOR.
Joel Whitney
By T. W. Porter Atty
AM. PHOTO-LITHOGRAPHIC CO. N.Y. (OSBORNE'S PROCESS.)

UNITED STATES PATENT OFFICE.

JOEL WHITNEY, OF WINCHESTER, MASSACHUSETTS, ASSIGNOR OF PART INTEREST TO N. J. SIMONDS.

IMPROVEMENT IN MACHINES FOR ROLLING LEATHER.

Specification forming part of Letters Patent No. 37,991, dated March 24. 1863; reissue No. 4,122, dated September 13, 1870; reissue No. 4,562, dated September 19, 1871.

*To all whom it may concern:*

Be it known that I, JOEL WHITNEY, of Winchester, in the county of Middlesex and State of Massachusetts, have invented certain Improvements in Machines for Rolling Leather, of which the following is a specification:

This invention relates to improvements in rolling-machines, in which the pressure of the rolls is applied to the leather through the agency of a treadle, either direct or in conjunction with an adjusting device by which the rolls are arranged in relation to each other, as the varying thickness of the leather may require; and the invention consists, first, in the peculiar arrangement of the treadle and levers relatively to each other, and also of the levers to the rolls; second, in the arrangement of the parts of the machine, so that in the movement of the rolls either for adjustment or when applying the treadle-pressure the rolls move in right lines when advancing toward or receding from each other; and lastly, in so combining with the treadle, levers, and rolls an adjusting device as that the bearings of one roll and the roll itself may be moved to or from the other roll without changing the position of the treadle relatively to the levers, or of the levers relatively to the treadle, as will be hereinafter more fully explained. By this construction the machine is rendered much more compact without reduction of its capacity, either of force or adjustment; the centers of the rolls in all relative changes of their positions always move toward or from each other in a straight and direct line instead of moving in a curved or indirect line, as was the case before my invention; and when the adjusting device is combined with the treadle-action the same machine is capable of being used for rolling leather or other material of all degrees of thickness, the distance between the rolls being first graduated to the thickness of the material by the adjusting mechanism, and the roll actuated by the treadle being forced toward the other, while the machine is in operation, to increase the pressure against the leather as its condition may require.

In the accompanying drawing, Figure 1 is a top or plan view of my invention. Fig. 2 is a longitudinal vertical section taken on line *y y*, Fig. 1. Fig. 3 is an end elevation, shown at the right of Figs. 1 and 2, the adjusting device here shown being the same as contained in the upper parts of Figs. 1, 2, and 3, and the treadle-action the same as shown in Fig. 4 of my said patent heretofore surrendered.

Similar letters of reference indicate like parts in the several figures.

In the drawing, A A denote the standards, which, with cross-beams *a a* and *b b*, constitute the frame of the machine, in which frame the pressure-rolls B B′ are properly mounted, being journaled in boxes which are capable of a vertical movement between the upright parts of the frame, and are guided therein. The roll B′ is journaled in boxes *d d*, as shown. These boxes rest upon the vertical sliding rods *e e*, which, in turn, are supported upon the outer ends of the horizontal levers *f f*, which are pivoted upon the pins *g g* passing through the brackets *h h* secured upon the frame A A, as shown. Two descending rods, *i i*, are, at their upper ends, pivoted to the respective inner ends of levers *f f*, as shown in Figs. 2 and 3. The lower ends of these rods are pivoted to treadle J, which latter, at its rear end, is pivoted to bracket *t*, secured upon the lower bar *c*, as shown in Figs. 1 and 3. The front or free end of the treadle J when at rest bears against the under side of the lower bar *b*, so that the action of the treadle is confined to the space between this bar and the floor, and by thus actuating the treadle the roll B′ will be raised or lowered in a ratio proportionate to the power gained by the compound leverage just explained, the distance which the roll may be raised being small, but the force exerted thereon being great. The treadle, and the devices by which it is connected with the roll, as just explained, or equivalent devices, constitute what is termed the treadle-action. The adjusting devices are as follows: The roll B is journaled in sliding boxes *l l*, which latter are suspended upon the screw-rods *n n*, which fit into corresponding screw-nuts in the boxes, as shown in Fig. 2. These rods are suspended and revolve in the horizontal bar C, being held from vertical motion by collars both above and below bar C. Upon the upper extremity of these rods are rigidly secured bevel-gears *o o*, which mesh into similar gears *p p* secured upon shaft D, which revolves in bearings F F upon bar C. A hand-wheel, E, secured upon shaft D, furnishes the means of rotating the same, whereby, through the action of gears *p p o o* and screw-rods *n n*, engaging in nuts *l l*, as stated, the roller B may be readily raised or lowered in order to adjust it relatively to roller B′, so that the limited movement of the latter roller toward the former by the action of treadle J, as before stated, shall give the required amount of pressure upon any thickness of stock which may be passed between the rolls. Motion is imparted to the rolls by means of hand-wheel G, or a gear-wheel or pulley and belt occupying its place, and revolving in the direction indicated by the arrow thereon. This wheel revolves upon the short stud *r* secured in the frame A. A pinion, *s*, secured to wheel G, engages with a gear-wheel marked 1, which engages with gears 2 and 3, and the latter with gear 4. The gears 1 and 3 revolve upon short studs secured in frame A, while gears 2 and 4 are secured upon the arbors of rollers B and B′, respectively, and these latter gears being slightly less in diameter than the rollers, therefore they never engage with each other. It will therefore be apparent that by rotating wheel G, as before described, motion will be imparted to all the gears in the directions indicated by the arrows respectively shown thereon, and the rollers, moving in opposite directions, will seize upon and pass through between them from the front to the rear of the machine any substance placed between them. Previous to my invention the levers *f* were placed in the same direction as the treadle J, and the lower roll was journaled in boxes affixed to the rear or short arms of the levers, while the only means of adjusting the scope of movement of the rolls was by rearranging the length of the connecting-rod between the treadle and the levers; therefore, the machine was necessarily extended from front to rear, in proportion to the extent of the length of the treadle and levers; whereas, in my machine, by arranging the levers parallel with the axis of the rolls they necessitate no increase in the depth of the machine, or, in other words, the depth of the machine is decreased to the extent of the length of the levers; and by combining and arranging the levers, treadle, and bearings of the rolls so that the centers of the rolls advance toward and recede from each other in right or direct lines, less motion is required to produce the same pressure; while by arranging the adjustment of one roll relatively to the other, independently of the relative positions of the treadle and levers, and by means of appliances connected with the journal-boxes, the power and scope of the treadle-action is unvarying when rolling any thickness of stock.

The combination or arrangement of the general adjustment of one roll toward the other, and the ultimate and independent pressure of the treadle, may be accomplished in a variety of ways. Both actions may be imparted successively to the same roll, as is shown in my patent of September 22, 1863, (No. 40,069;) or the adjustment may be performed upon the lower roll and the treadle-action applied to the upper roll, as may be desired; and my arrangement of the levers relatively to the treadle and rolls may be employed where no general adjustment of the rolls is used.

I do not claim, in the abstract, the employment of the treadle and levers in rolling-machines; nor do I claim, broadly, the arrangement of rolls to move in right lines; neither do I claim, broadly and in the abstract, a varying distance between the rolls for thicker or thinner leather; but What I do claim as new, and desire to secure by Letters Patent, is—

1. The arrangement of levers *f f* transversely to the treadle J and parallel with the axes of the rolls B and B′, substantially as described and shown.

2. The combination and arrangement of treadle J, rolls B B′, and levers *f f*, or equivalent intermediate devices between the treadle and rolls, whereby the action of the treadle serves to move one roll in a direct line toward the other, substantially as described and shown.

3. In combination with the treadle devices, by which one roll is actuated toward or away from the other roll, an adjusting device, as shown, or its equivalent, by which one roll may be adjusted with respect to the other roll independently of the treadle mechanism, and without changing the positions of the treadle and levers relatively to each other, substantially as described and shown.

JOEL WHITNEY.

Witnesses:
MARY R. LANE,
EBEN HUTCHINSON.

(57.)